United States Patent [19]

Spielberger et al.

[11] 3,972,939

[45] Aug. 3, 1976

[54] PROCESS FOR THE PREPARATION OF POLYETHYLENE-POLYAMINE SALTS OF LOW VISCOSITY

[75] Inventors: Georg Spielberger, Leverkusen; Knut Hammerström, Cologne, both of Germany

[73] Assignee: Bayer Aktiengesellschaft, Leverkusen, Germany

[22] Filed: Oct. 9, 1974

[21] Appl. No.: 513,314

[30] Foreign Application Priority Data

Oct. 16, 1973   Germany............................ 2351754

[52] U.S. Cl. .............................. 260/583 P; 260/684
[51] Int. Cl.[2] ......................................... C07C 85/00
[58] Field of Search................................. 260/583 P

[56] References Cited
UNITED STATES PATENTS
3,751,474   8/1973   Phillips et al..................... 260/583 P

*Primary Examiner*—Allen B. Curtis
*Attorney, Agent, or Firm*—Plumley and Tyner

[57] ABSTRACT

Polyethylene-polyamine salts of low viscosity and high retention action, are prepared by subjecting polyethylene-polyamine salts of higher viscosity to a thermal degradation by heating their aqueous solutions in closed reaction vessels to temperatures of 100° to 180° C under pressures of 2 to 10 atmospheres.

3 Claims, No Drawings

PROCESS FOR THE PREPARATION OF POLYETHYLENE-POLYAMINE SALTS OF LOW VISCOSITY

It is already known that polyethylene-polyamines, for example, diethylenetriamine, triethylenetetramine, tetraethylenepentamine or pentaethylenehexamine and hexaethylenehxamine can be condensed with dichloroethane and sodium hydroxide solution to give higher-molecular polyethylene-polyamine salts, see, for example, Spanish Patent Specification No. 287,939. These polyalkylene-polyamine salts are suitable for use as cationic flocculating agents.

An important field of use for these flocculating agents is the precipitation of fine fibres and slimes from the paper stuff in the manufacture of paper, so that the drainage from the paper wire contains less organic substances and the paper felt dewaters more rapidly and, because it is drier when it comes from the paper wire, also dries more rapidly.

However, a difficulty with these flocculating agents is that, on the one hand, their activity as flocculating agents increases with their molecular weight whilst, on the other hand, their transportation and use becomes more difficult with increasing molecular weight, because of the high viscosity. At lower temperatures, in particular, the viscosity of these products rises so greatly that the users encounters difficulties in pumping an metering the highly viscous solutions. These difficulties do not arise with the polyethylene-polyamine salts of lower viscosity, but instead they suffer from the disadvantage of lower activity, for which reason they must be used in larger amounts in order to achieve the same degree of dewatering.

It has now been found that the high activity of the highly viscous polyalkylene-polyamine salts can be maintained, and even exceeded, at substantially lower viscosities, if the highly viscous polyalkylene-polyamine salts are first prepared in a known manner, for examplein accordance with the abovementioned Spanish Patent Specification No. 287,939, and these highly viscous polyalkylene-polyamine salts are then subjected to a reduction in viscosity by a subsequent heat treatment in closed reaction vessels at temperatures of 100° to 180°C and pressures of 2 to 10 atmospheres.

The present invention therefore relates to a process for the preparation of polyethylene-polyamine salts of relatively low viscosity which nevertheless have a high retention action; the process is characterised in that polyethylene-polyamine salts of higher viscosity are subjected to a thermal degradation, by heating in closed reaction vessels to 100°–180°C, preferably 105°–120°C, under pressures of 2 to 10 atmospheres, until the desired viscosity is reached.

The polyalkylene-polyamine salts of relatively low viscosity, prepared according to the invention, are salts of which an approximately 25% strength aqueous solution (calculated as free polyalkylene-polyamine) has a viscosity of 300 to 600 cP at 25°C.

The starting materials used in the process according to the invention are polyalkylene-polyamine salts of which an approximately 25% strength aqueous solution (calculated as free polyalkylene-polyamine) is above 900 cP, and preferably is 900 to 10,000 cP, at 25°C.

For example, the process according to the invention is carried out by preparing a polyalkylene-polyamine salt solution which already gels in the cold and is thus, in a normal case, unusable for further processing as a flocculating agent, and subsequently heating this solution in a closed reaction vessel under pressures of 2 to 10 atmospheres and temperatures of 100° to 180°C, preferably 105° to 120°C, until the aqueous solution has the desired viscosity. If the pressure is to lie above the steam pressure prevailing at the working temperature, it can be increased to the desired pressure by introduction of inert gases, for example nitrogen.

Using the thermal degradation according to the invention, even polyalkylene-polyamine condensation products which have not turned out correctly, and which have, for example, completely gelled because of a mistake in metering the dichloroethane and can no longer be stirred whilst cold, can be converted into normally usable solutions without any gel content. In such a case, higher temperatures, for example 150°C, and pressures of 6 atmospheres are preferably used; heating is carried out until an amine salt solution of lower viscosity, which is free from gel content, has been produced.

Should the thermal degradation have proceeded too far, the viscosity of the polyalkylene-polyamine salts of excessively low viscosity can be raised to the desired viscosity value by addition of dichloroethane.

The parts mentioned in the example which follows are parts by weight, unless stated otherwise.

EXAMPLE

First, 600 parts of dichloroethane are pumped over the course of 2 to 3 hours, at 120°C and 2 to 5 atmospheres, into 1,650 parts of a mixture, contained in a closed stirred vessel, of pentaethylenehexamine, hexaethylenehexamine, hexaethyleneheptamine, heptaethyleneheptamine and ethylenediamine (weight ratio of the components 43:14:13:8:22) and 2,000 parts of water; thereafter, 500 parts of dichloroethane, 900 parts of 50% strength aqueous sodium hydroxide solution and 2,600 parts of water are pumped in simultaneously over the course of 3 hours. The reaction mixture is then condensed at 110°C by slowly metering in a further 100 parts of dichloroethane, until a viscosity of 500 cP at 110°C (= 5,000 cP at 25°C) has been reached.

The condensation product thus obtained is then stirred for 3 hours at 110° to 114°C under a pressure of 2 to 3 atmospheres. Whilst doing so, the viscosity decrease is determined continuously. As soon as the viscosity of the reaction mixture has fallen to 115 cP at 114°C (= 530 cP at 25°C), the thermal degradation is discontinued and the reaction mixture is cooled to room temperature.

The condensation product thus obtained is distinguished by an excellent retention action.

What we claim is:

1. A process for preparing a polyethylene-polyamine salt of relatively low viscosity and high retention action comprising subjecting a polyethylene polyamine salt, of a viscosity of 900–10,000 cp at 25°C in substantially 25% strength aqueous solution and having high retention action, to thermal degradation by heating its aqueous solutions in a closed reaction vessel at 100°–180°C and at a pressure of 2–10 atmospheres, thereby reducing the viscosity of said salt to a viscosity of 300–600 cp at 25°C in substantially 25% aqueous solution.

2. A process according to claim 1 wherein the temperature is 105°–120°C.

3. A process according to claim 1 wherein the viscosity of the polyethylene polyamine salt of reduced viscosity is subsequently raised by addition of dichloroethane.

* * * * *